United States Patent
Cairns et al.

(10) Patent No.: US 7,263,968 B2
(45) Date of Patent: Sep. 4, 2007

(54) EXHAUST GAS RECIRCULATION

(75) Inventors: Alasdair Cairns, Northamptonshire (GB); Hugh Blaxill, Oxfordshire (GB)

(73) Assignee: Mahle Powertrain Limited, Northampton (GB)

( * ) Notice: Subject to any disclaimer, the term of this patent is extended or adjusted under 35 U.S.C. 154(b) by 0 days.

(21) Appl. No.: 11/238,216

(22) Filed: Sep. 29, 2005

(65) Prior Publication Data

US 2006/0102158 A1    May 18, 2006

(30) Foreign Application Priority Data

Sep. 30, 2004  (GB) ................... 0421682.6
Apr. 8, 2005   (GB) ................... 0507153.5

(51) Int. Cl.
  *F02B 17/00*   (2006.01)
  *F02B 47/08*   (2006.01)
  *F02B 75/02*   (2006.01)
  *F01L 1/34*    (2006.01)
  *F02M 25/07*   (2006.01)

(52) U.S. Cl. ................... 123/295; 123/90.15; 123/316; 123/568.14

(58) Field of Classification Search ................ 123/295, 123/299–305, 315, 316, 430–432, 568.11, 123/568.14, 90.15, 90.16, 90.17, 90.18, 698; 701/108; 60/605.2
See application file for complete search history.

(56) References Cited

U.S. PATENT DOCUMENTS

| | | | |
|---|---|---|---|
| 6,390,057 B2 * | 5/2002 | Yoshizawa et al. ......... | 123/295 |
| 6,543,411 B2 * | 4/2003 | Raab et al. ................. | 123/305 |
| 6,609,493 B2 * | 8/2003 | Yamaguchi et al. ... | 123/568.14 |
| 6,748,936 B2 | 6/2004 | Kinomura et al. | |
| 6,807,937 B2 * | 10/2004 | Gianolio et al. ....... | 123/568.14 |
| 7,066,158 B2 * | 6/2006 | Kuzuyama ............. | 123/568.14 |
| 2001/0013329 A1 | 8/2001 | Matsumoto | |

FOREIGN PATENT DOCUMENTS

| | | |
|---|---|---|
| EP | 0889219 | 1/1999 |
| EP | 1136675 | 5/2002 |
| EP | 1130240 | 7/2003 |
| EP | 1273770 | 7/2003 |

OTHER PUBLICATIONS

The Effects of Combined Internal & External Exhaust Gas Recirculation on Gasoline Controlled Auto-Ignition by Alasdair Cairns and Hugh Blaxill, Cosworth Technology Ltd., Northampton, UK , Copyright 2004 SAE Intrnational.

* cited by examiner

*Primary Examiner*—Willis R. Wolfe, Jr.
(74) *Attorney, Agent, or Firm*—Spencer, Fane, Britt & Browne LLP (57) ABSTRACT

An internal combustion engine comprising, an engine management unit, a combustion chamber having an inlet port and an outlet port, a fuel supply mechanism to supply gasoline to the engine, a valve train mechanism to permit introduction of air to the inlet port of the combustion chamber and release exhaust gases from the outlet port of the combustion chamber, and an external recirculating system whereby exhaust gases from the outlet port may be passed to the inlet port, wherein, the engine management unit is operable to, control the valve train mechanism to retain and/or rebreathe exhaust gases within the combustion chamber to cause the engine to operate in a controlled auto ignition combustion mode, and control the external recycling system to supply exhaust gases to the inlet port in the controlled auto ignition combustion mode, such that self-ignition occurs in the combustion chamber.

16 Claims, 9 Drawing Sheets

EXHAUST GAS RECIRCULATION

FIELD OF THE INVENTION

This invention relates to control of an internal combustion engine, in particular a combustion engine operating in a controlled auto ignition mode.

BACKGROUND OF THE INVENTION

Conventionally, internal combustion engines use "spark ignition" ("SI") to ignite a fuel-air mixture in the engine cylinder using an electrical spark. A further operating mode is also known, referred to as controlled auto-ignition ("CAI"), for example as described in Allen J., and Law D.,: "Variable Valve Actuated Controlled Auto-Ignition; Speed Load Maps and Strategic Regimes of Operation", SAE paper no. 2002-01-0422. In CAI, hot exhaust gases from combustion are either retained in the engine cylinder or rebreathed from the exhaust manifold, so-called exhaust gas recirculation ("EGR") for example by controlling the cylinder valves such that the exhaust valve is closed early or re-opened during the inlet stroke of the engine cycle to increase the trapped burnt gases. The mix of fuel, air and burnt gases self-ignites on compression. CAI operation has been shown to provide higher fuel economy and reduced pollutant formation compared with SI operation.

CAI is however only available over certain operating regimes of the engine. Outside these regimes, insufficient burst gas temperatures or the onset and increase of engine knock, which is associated with unwanted engine noise and can ultimately result in engine damage, becomes unacceptable and a transition to spark ignition operation is required.

An aim of the invention is to reduce or overcome the above problem.

SUMMARY OF THE INVENTION

According to a first aspect of the invention we provide an internal combustion engine comprising an engine management unit, a combustion chamber having an inlet port and an outlet port, a fuel-supply mechanism to supply gasoline or a gasoline-like fuel to the engine, a valve train mechanism to permit introduction of air to the inlet port of the combustion chamber and release exhaust gases from the outlet port of the combustion chamber, and an external recirculating system whereby exhaust gases from the outlet port may be passed to the inlet port, wherein the engine management unit is operable to control the valve train mechanism to retain and/or rebreath exhaust gases within the combustion chamber to cause the engine to operate in a controlled auto ignition combustion mode, and control the external recycling system to supply exhaust gases to the inlet port in the controlled auto ignition combustion mode.

By 'gasoline-like fuel' we mean fuel such as alcohols or bio-fuels.

It has been found, unexpectedly, that the use of both internal and external EGR increases the operating regime in which controlled auto ignition can be used in both steady state and transient conditions by a substantial amount, with a lower compression ratio than required for homogenous charge compression ignition ('HCCI') and without the inlet air heating required by HCCI Controlling the valve train mechanism to provide exhaust gas within the combustion chamber may include controlling the valve train mechanism to retain exhaust gases within the chamber, or rebreathe exhaust gases from the exhaust manifold.

The engine may comprise at least one sensor responsive to an engine operating parameter, the engine management unit being operable to receive an output from the sensor and control the valve train mechanism and the external recirculating system in accordance with the output.

The engine may comprise one or more sensors operable to detect one or more engine operating parameters selected from; intake air mass flow, exhaust composition, crank shaft position, cam shaft position, exhaust gas temperature, intake pressure, intake temperature.

The engine management unit may comprise stored controlled data, the stored controlled data indicating the quantity of exhaust gas to be retained in the combustion chamber and supplied through the external recirculating system as a function of the engine speed and engine load.

The quantity of exhaust gas retained or rebreathed in the combustion chamber and supplied through the external recycling system may additionally be a function of the engine operating parameter.

The fuel supply mechanism may be controllable such that the to fuel-air ratio $\lambda$ on the range 0.8 to 2.5.

The air-to-fuel ratio $\lambda$ may be in the range 1 to 1.6.

The engine may further comprise a fuel supply mechanism, for example direct or indirect injection, the engine management unit being operable to control the fuel supply mechanism.

The engine may further comprise a throttle to control inlet air mass flow, the engine management unit being operable to control the throttle such that air pressure within the inlet manifold is at or near ambient pressure.

The engine may further comprise a spark plug, the engine management unit being operable to operate the spark plug to cause ignition in the combustion chamber when the engine is operating in a spark combustion mode.

The engine management unit may be operable to detect that a transition from a spark ignition mode to a controlled auto-ignition mode or vice-versa is required and may be operable to control the valve train mechanism, a throttle to control inlet air mass flow, the external recirculating system and fuel supply mechanism to cause the transition.

The proportion of exhaust gases retained and/or rebreathed in the combustion chamber is in the range 20% to 99%, and more preferably in the range 30% to 80%.

The proportion of exhaust gas supplied to the combustion chamber by the external recirculating system may be up to about 15%.

By 'proportion' we mean the proportion of the gas, air and fuel mix drawn into or supplied to the combustion chamber which is made lip of exhaust gases.

BRIEF DESCRIPTION OF THE DRAWINGS

The invention will now be described by way of example only with reference to the accompanying drawings wherein.

DETAILED DESCRIPTION OF THE INVENTION

Figure 1:
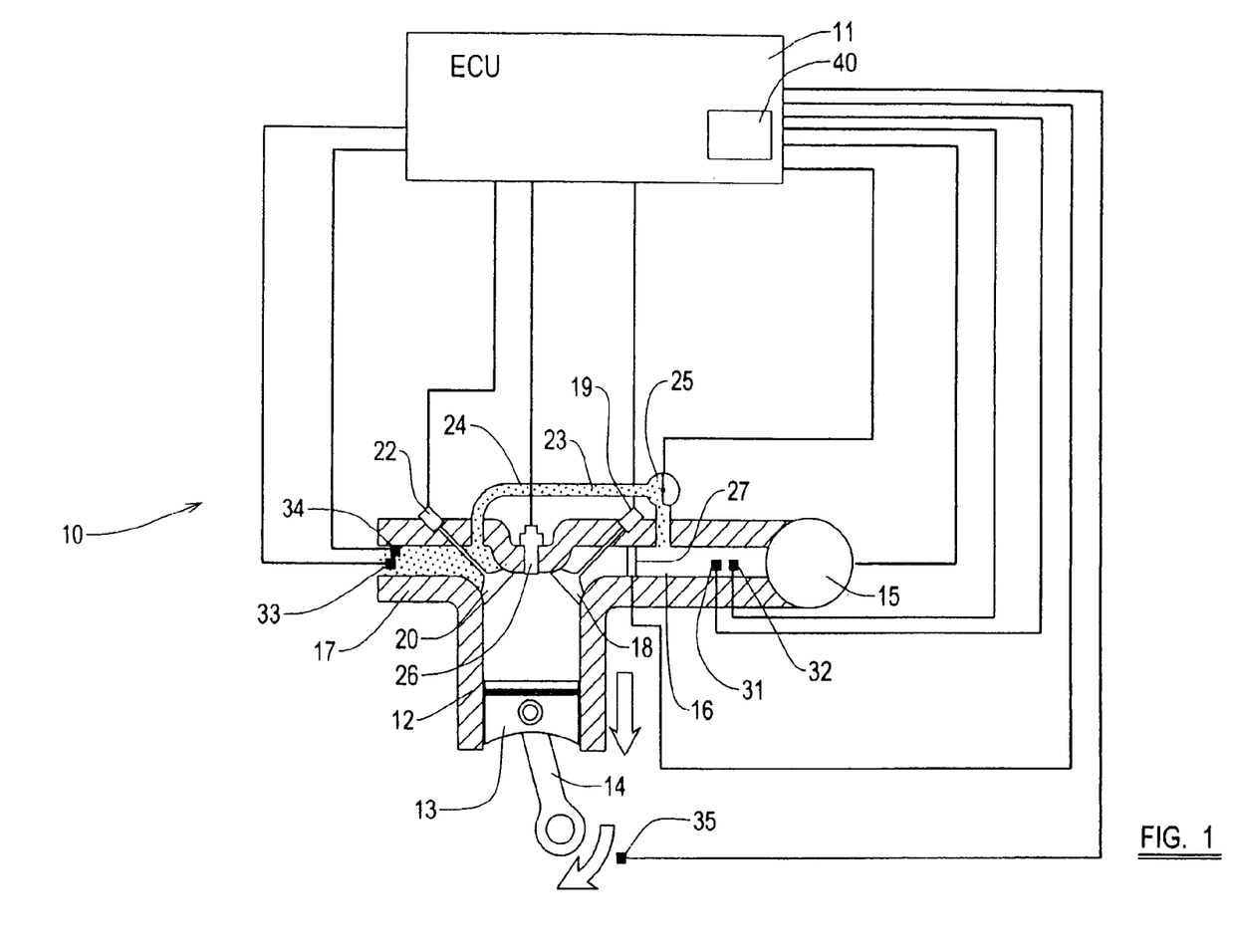
FIG. 1 is a diagrammatic illustration of part of an engine embodying the present invention.

Referring now to FIG. 1, part of an internal combustion engine embodying the present invention is shown at FIG. 1. The invention comprises an engine management system having an electronic control unit 11 and one or a plurality of cylinders, of which for clarity only one is shown at 12. In conventional manner, a piston 13 is moveable within the cylinder 12 and drives a crank shaft through a con rod 14. Air is supplied to the cylinder 12 through an intake throttle 15 and manifold generally illustrated at 16. Fuel may be introduced into the air in the manifold 16 or in the cylinder 12, depending on whether indirect or direct injection is used. The ECU 11 is preferably operable to control the supply of fuel to provide the desired air-to-fuel ratio $\lambda$ for the engine operating conditions. Exhaust gases from the combustion are released from the cylinder via an outlet 17. A fresh charge, i.e. air or a fuel/air mix, is admitted to the cylinder 12 through an inlet port 18 and controlled by a valve train mechanism as shown diagrammatically at 19 and released to the outlet through an outlet port 20 controlled by a valve train mechanism here generally shown at 22. The engine may have a plurality of input ports 18 and outlet ports 19 with corresponding valve train mechanisms 19, 22.

The engine 10 further comprises an external recycling system 23 comprising a channel 24 to duct exhaust gases from the outlet 17 via a valve 25 to the inlet manifold 16. As in this example, the valve 25 is preferably located close to the inlet manifold 16 to increase responsiveness by minimising the amount of gas between the valve 25 and inlet manifold 16. In this example, the channel 24 comprises a 25 mm pipe, approximately 200 mm long. The housing of the valve 25 allows the engine coolant to flow past the gas passage. After passing through the valve, the gases pass through a channel of 25 mm diameter approximately 330 mm long and connected to the inlet manifold 16. A swirl control valve 27 is shown provided in the intake manifold 16 under the control of the ECI 11 to control the swirl of the fuel-air mix introduced into the cylinder 12.

To provide for spark combustion operation, the cylinder 12 is further provided with one or more spark plugs 26, controlled by the electronic control unit 11.

To permit the electronic control unit 11 to measure operating parameters of the engine 10 and control the engine 10 accordingly, appropriate sensors may be provided. In this example, an intake pressure sensor 31 and intake temperature sensor 32, an exhaust temperature sensor 33, a lambda sensor 34, to sense oxygen in the exhaust gases 34 and a crank position sensor shown at 35 are provided. Sensors may be provided to sense of other parameters, such as the intake air mass flow, cam shaft position, flame ionisation or cylinder pressure. In particular, as CAI operation depends on the ambient condition appropriate feedback based on one or more of the sensed parameters may be used. Example parameters and some possible types of sensors which may be used are shown in Table 1.

The valve 25 may be controlled by various methods, for example using a stepper motor so that the valve position is exactly known. Each sensor is connected to the electronic control unit 11 by an appropriate control line as shown in FIG. 1.

Figure 2:
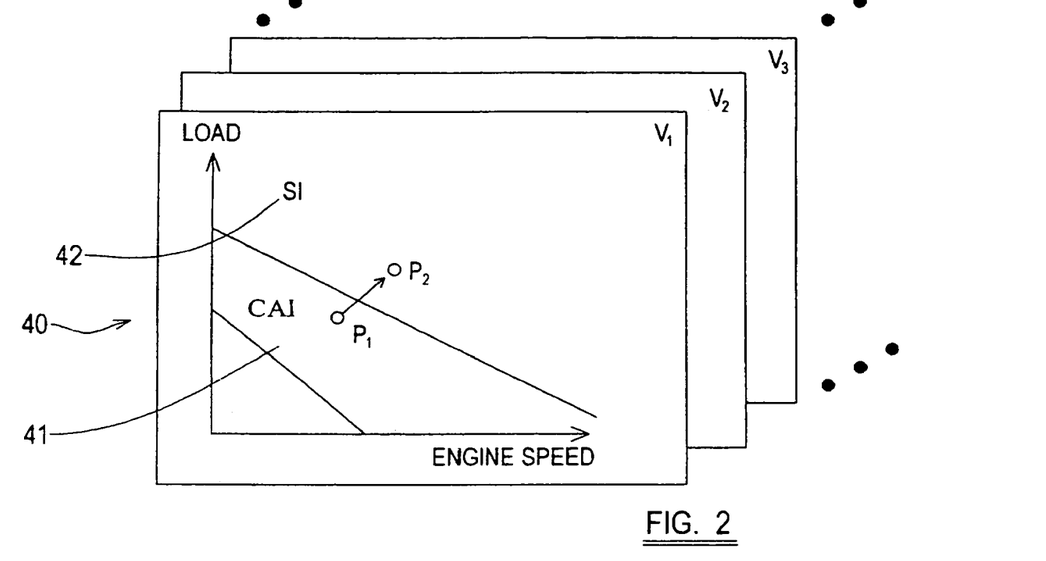
FIG. 2 is a diagrammatic illustration of a map of an operating regime of the present invention.

To enable the electronic control unit 11 to control operation of the engine 10, a map 40 of operating regimes is provided in the electronic control unit 11. The map 40 is schematically shown at FIG. 2, and is in effect an n-dimensional map of operating regimes for the controlled auto ignition mode and spark ignition mode as a function of engine speed and load for sets of parameter values $V_1$, $V_2$, $V_3$ . . . In FIG. 2, the regime in which the controlled auto ignition mode may be used is generally shown at 41 and the regime in which the engine may be operated in spark ignition mode is shown at 42. At the boundaries of the CAI regime 41, it may be also appropriate to operate in a so-called spark-assisted CAI mode, where the fuel, air and exhaust gases are supplied in a similar method to operating in a CAI mode but where a spark is supplied to initiate combustion rather than relying on auto-ignition alone. In this description, the term 'spark combustion mode' is intended to refer to both spark ignition and spark-assisted CAI.

TABLE 1

| Parameters and suitable sensors | |
|---|---|
| Parameter | Sensor |
| Intake air mass flow | Hot file air mass meter |
| Fuel | Lambda sensor |
| Crankshaft position | Inductive pick-up |
| Camshaft position(s) | Hall effect |
| Exhaust gas temperature | Thermocouple |
| Intake manifold pressure | Piezo |
| Intake manifold temperature | Thermocouple |
| External EGR | Stepper Motor position |

When operating in the CAI mode in regime 41, the electronic control unit 11 is operable to control the intake throttle 15 such that the engine 10 is running with the air pressure and temperature in the inlet manifold 16 at or near ambient pressure and temperature. Advantageously, the engine can be operated without heating of the inlet air. The inlet valve 19 and outlet valve 22 are controlled such that there is no overlap in opening between the valves and to retain exhaust gases within the cylinder 12, so called internal EGR. In the present example, the valve lift was 4.5 mm and 160° crank angle duration to take account of sufficient gas trapping and valve train loading constraints. Variable valve times of 35° c.a. on the inlet valve camshaft and 55° c.a. on the outlet valve camshaft were available. The inlet cam timing was set to 140° c.a. TDC in the present example. The internal EGR may also be rebreathed from the outlet 17 as appropriate. The compression ratio is preferably in the range of about 8 to 14 and in this example 11.2:1, but may have any appropriate geometric compression ratio typical of those found in modern ignition engines.

The external exhaust gas recirculation, or external EGR, passes exhaust gases through the external recycling system 23 and the control valve 25. An effect of passing the exhaust gas through the external recycling system 23 to the inlet manifold 16 is to cool the recirculated exhaust gas, in particular where engine coolant is allowed to flow past the gas passage as in the present example. By varying the proportions of exhaust gas recirculated through internal and external exhaust gas recirculation, together with control of the swirl control valve 27, the air-to-fuel ratio $\lambda$ and the timing of the fuel injection, the operation of the engine can be appropriately controlled. In particular, the addition of external EGR reduces the rate of heat release and thus inhibits knock by diluting the fuel/air/retained or rebreathed exhaust gas mix within the cylinder 12. It is this diluting mechanism which is believed to reduce the onset and intensity of knock within the engine 10. The proportions may be controlled by the electronic control unit 11 in accordance with the map 30 and in response to the values of the engine parameters received from the various sensors. Example methods of providing external EGR are shown in Table 2. The engine load and/or engine speed can be controlled by varying the proportion of exhaust gas recirculated to the cylinder 12.

TABLE 2

Example methods of supplying external EGR

| Method | Advantages | Disadvantages |
|---|---|---|
| Intake manifold throttling | Negligible additional cost. Minimal engine pumping losses | Small transient changes in intake manifold pressure have a large effect on CAI combustion (continual feedback required) |
| Exhaust back-pressure (via exhaust system) | Negligible additional cost. Easier to implement than intake throttling due to less influence on intake conditions | Insufficient EEGR flow at low speed may require small increase in backpressure, with increased engine pumping losses |
| Exhaust back-pressure (additional valve or restriction) | Reduced pumping losses when EEGR not required. | Increased engine pumping losses during CAI. Marginal on-cost deficit. |
| Venturi in EEGR pipework | Minimal additional cost. | Limited increase in flow. |
| EEGR pump (mechanical or electrical) | Excellent control over EEGR flow | Relatively high cost solution. |

Figure 3:
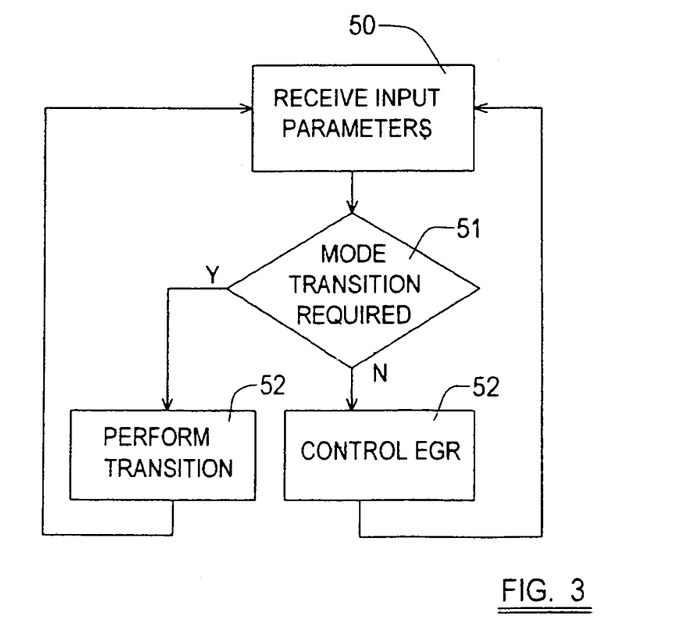
FIG. 3 is a diagrammatic illustration of the operation of the electronic control unit of FIG. 1.

To permit the engine to operate in the spark ignition regime as well, the engine management unit needs to be able to detect and manage transitions, such as that shown from $P_1$ to $P_2$ in FIG. 2. In the outline method shown in FIG. 3, at step 50 the engine control unit 11 receives information on engine operating parameters, including the engine parameters from the sensors plus possibly any demand from a driver of the vehicle or measured change in load. At step 51, the electronic control unit 11 detects whether a mode transition is required, and if not, then at step 52 the electronic control unit 11 controls the exhaust gas recirculation and other aspects of the engine 10 in accordance with the detected parameters. If a transition is required, that is a change between operating modes is required or is predicted in response to the parameters, then at step 52 the transition step is performed. The transition step may include changing the relative timing and/or lift and/or duration of the opening and closing of the inlet valve 19 and outlet valve 22, such that the valves open and close to allow spark combustion operation, eg varied timing and/or increased duration and/or increased lift. In addition, the amount and proportion of EGR is reduced, with a particular reduction in external EGR allowing an additional degree of control over temperature within the cylinder 12 to avoid knocking. Ideally, the transition should occur within a few engine cycles to avoid unwanted fluctuation in engine torque. The EGR mass should be varied with simultaneous variations in the intake air and/or fuel mass to avoid the engine running into a region of knock. In the transition, spark-assisted CAI may be used as discussed above. It has been found that using external EGR can reduce the value of PK Max at a transition from spark ignition to CAI from about 3 bar to about 1.5 bar, and the external EGR varies from about 10% in SI operation to about 2% in CAI operation.

Figure 4:
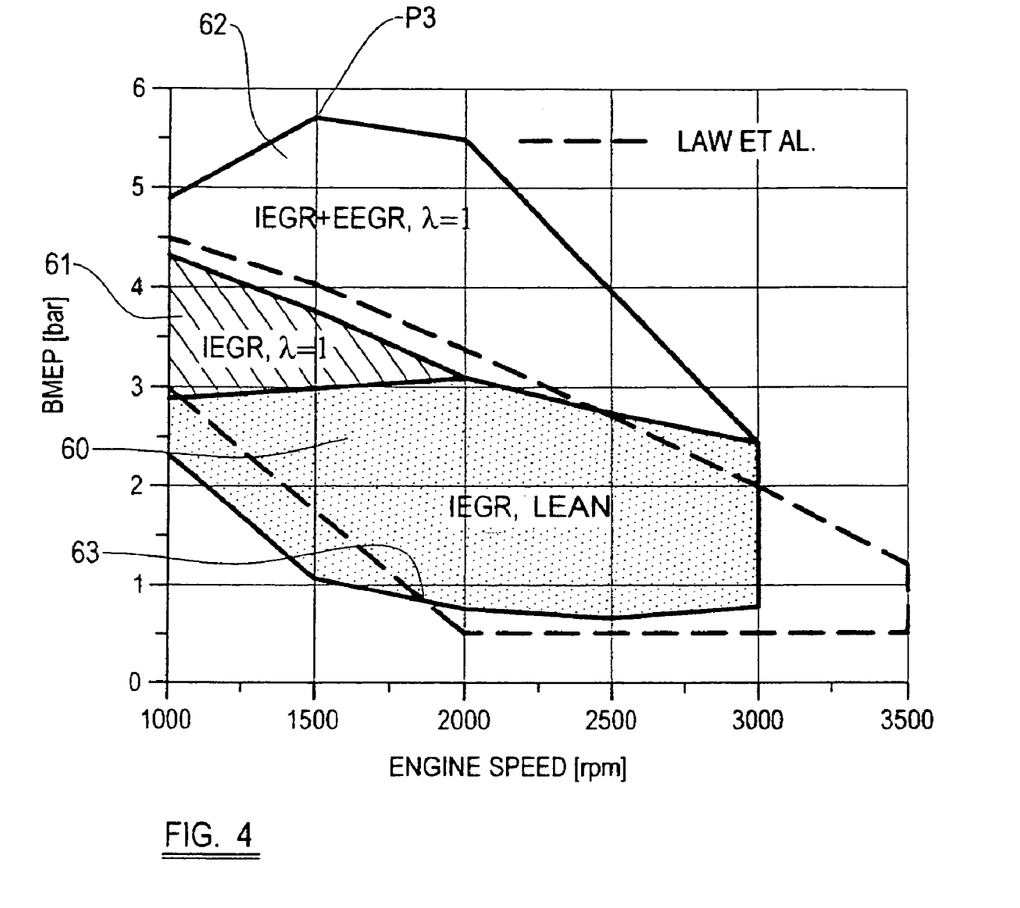
FIG. 4 is a graph of load against engine speed showing the previously known CAI operating regime and showing the CAI operating regime of the engine of FIG. 1 outside the previous regime.
Figure 5A:
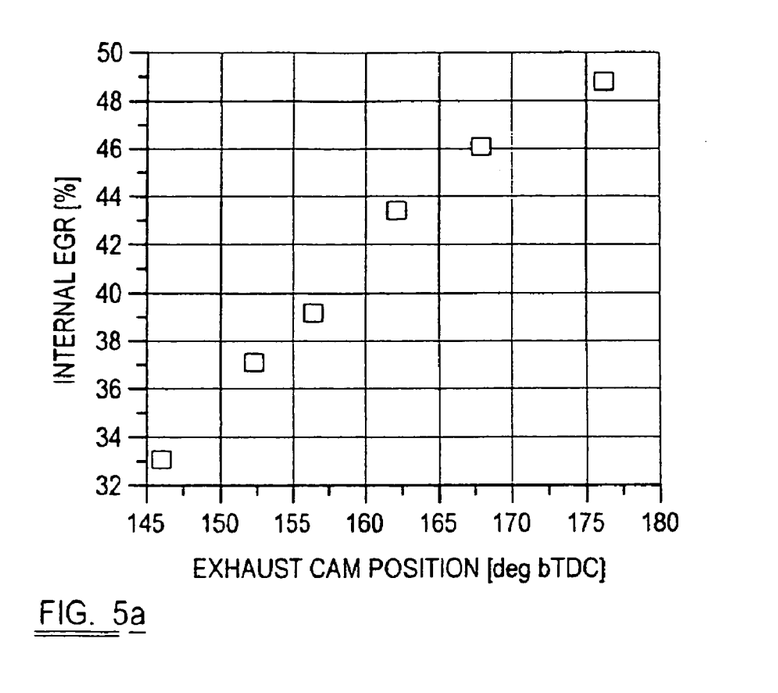
FIG. 5a is a graph of internal EGR against exhaust cam position.
Figure 5B:
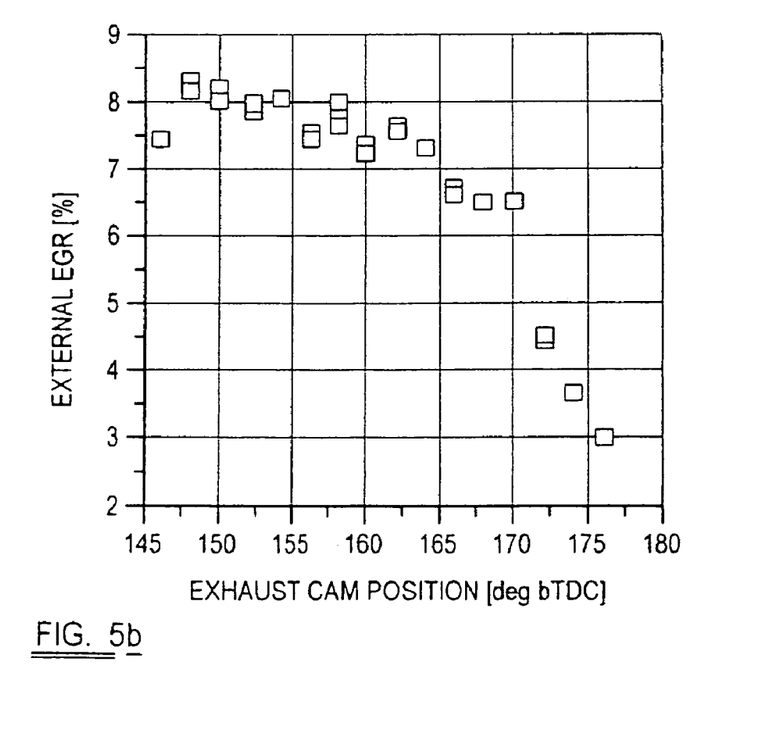
FIG. 5b is a graph of external EGR against exhaust cam position.
Figure 6A:
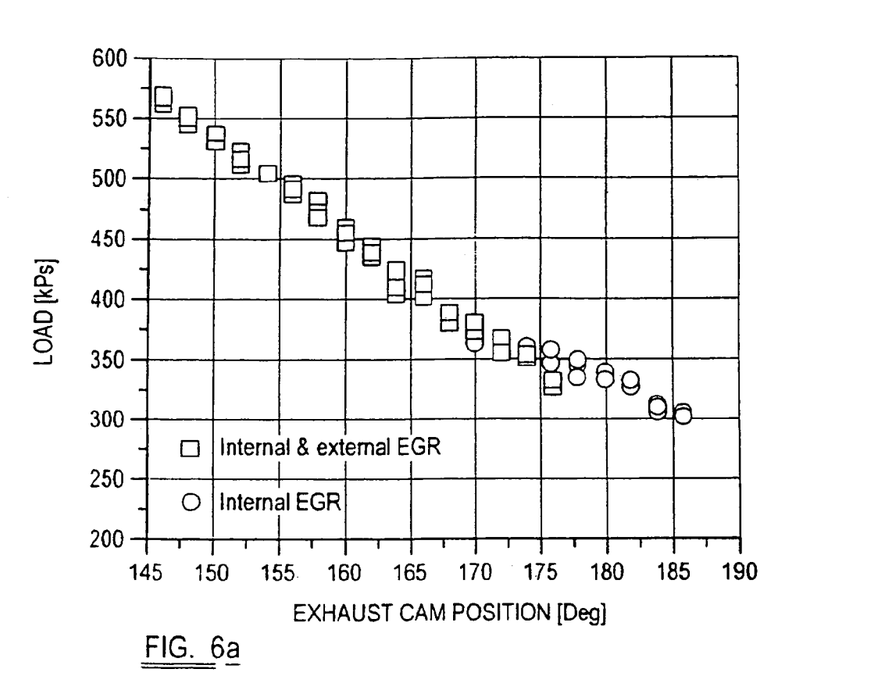
FIG. 6a is a graph of load against exhaust cam position.
Figure 6B:
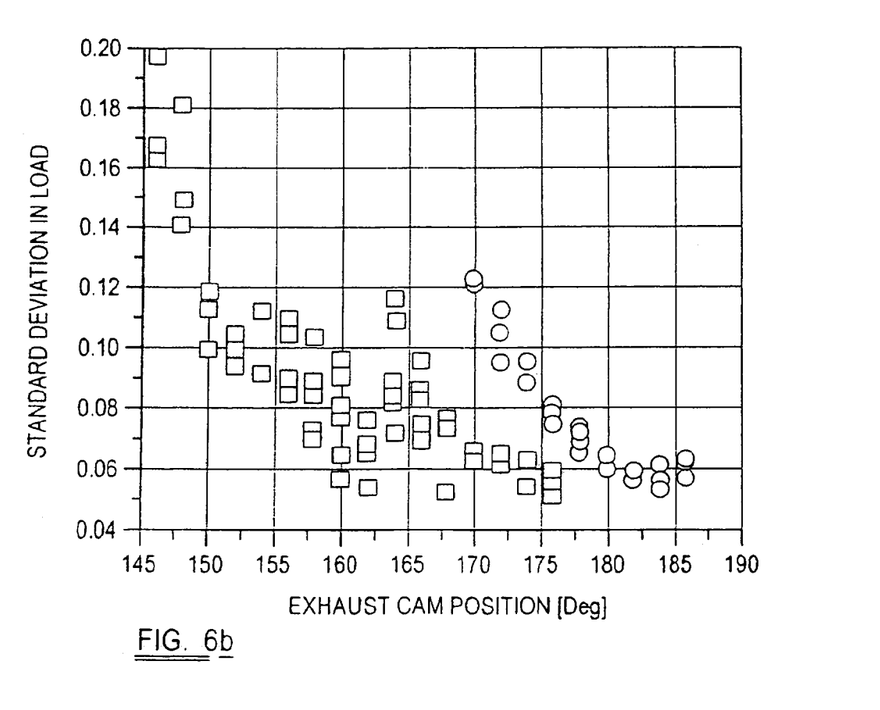
FIG. 6b is a graph of the load standard deviation against exhaust cam position.
Figure 6C:
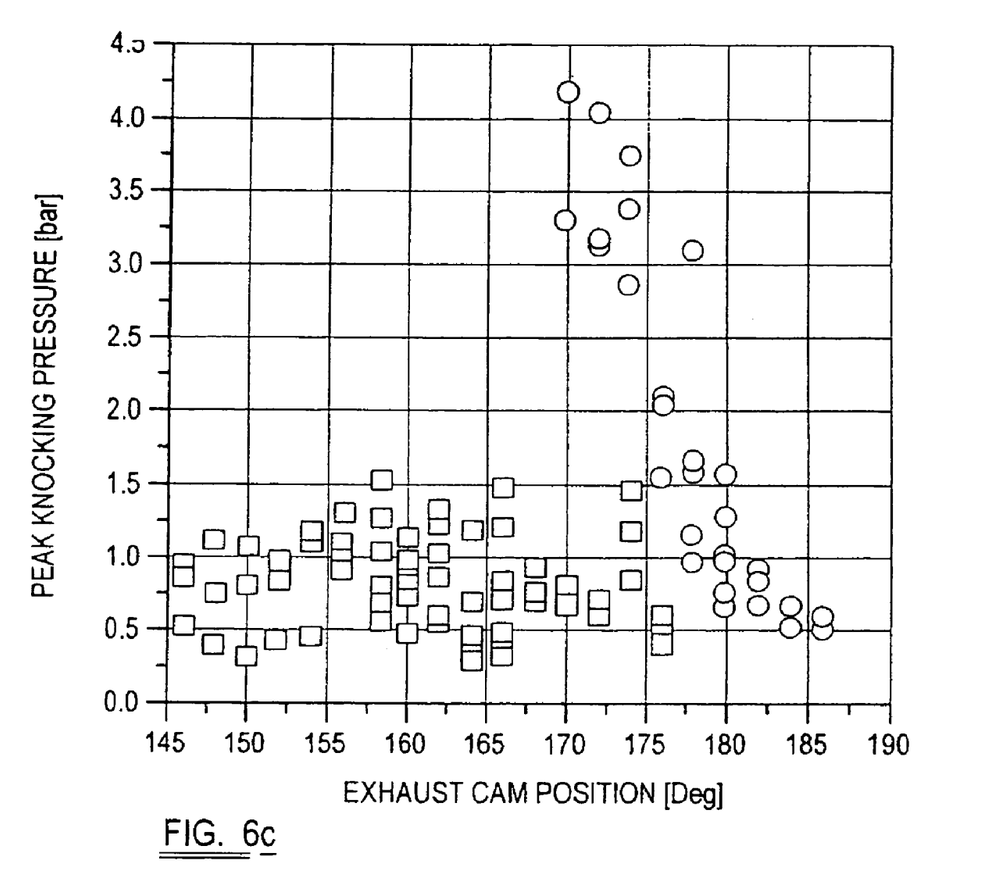
FIG. 6c is a graph of peak knocking pressure against exhaust cam position.

An illustration of the increase in operating range allowed by the engine is shown in reference to FIG. 4 showing engine speed against load. The area 60 shows where lean burn controlled auto-ignition was employed at lower loads. The hatched area 61 shows where stoichiometric operation was achieved using internal EGR alone. In region 62, this is the area of operation where controlled auto-ignition was delivered using combined IEGR and EEGR. The dashed outline 63 indicates the known regime in which controlled auto-ignition can occur. It will be apparent that by providing combined internal and external EGR, the available load of the engine under controlled auto-ignition can be increased. The greatest increase in available load was at point $P_3$ in this example. In the example of point $P_3$, internal and external EGR are supplied in the proportions as illustrated in the graphs of FIGS. 5a and 5b respectively plotted against exhaust cam position angle before top dead centre breathing, and the engine is able to operate at a speed of 1500 rpm providing an increase in available engine load of about 45%. The comparative engine operating characteristics are shown with reference to the graphs FIGS. 6a, 6b and 6c which show load, standard deviation in the load and the peak knocking pressure respectively as a function of exhaust cam position. Data points from 145° to 175° before top dead centre breathing (the maximum opening position) show the results for internal and external EGR, and in the range of 170° to about 185° for internal EGR alone. As shown in FIG. 6a, the load (plotted as gross mean effective pressure) which is generated using internal and external EGR is greater than that generated using internal EGR alone. As shown in FIG. 6b, the variation in the load using internal and external EGR is within a standard deviation of 0.2 over 300 engine cycles, representing a generally acceptable fluctuation. FIG. 6c shows the peak knocking pressure. A peak knocking pressure of 1 bar is considered to be acceptable in terms of audible noise in an open test cell. Engine damage may occur at peak knocking pressures on the order of 4 bar and above. As can be seen in FIG. 6c, the peak knocking pressure under internal EGR alone reaches an unacceptable pressure, whilst the peak knocking pressure remains comparatively low throughout the regime using internal and external EGR. It is this suppression of knock that enables the increase in available load as shown in FIG. 4.

Figure 7:
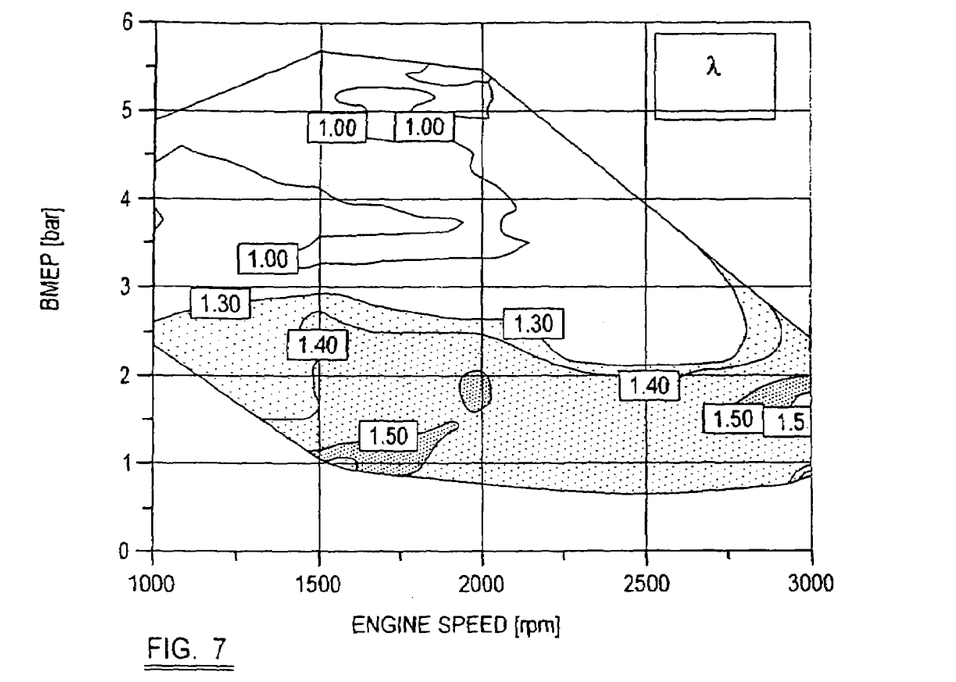
FIG. 7 is a graph of the relative air-to-fuel ratio over the CAI operating regime of FIG. 4.

FIGS. 7 to 10 show the control of various engine parameters over the whole of the operating ratio shown in FIG. 4. The relative air-to-fuel regime over the operating regime is shown in FIG. 7. As shown, it is possible to operate the engine in a stable manner at $\lambda=1.4$ over a relatively large range. At lower speeds, it the mixture is enriched to $\lambda=1.3$ or even to 1.0 to maintain acceptable combustion stability, whilst with lower loads it is possible to operate the engine at λ=1.6 which is preferential in terms of maximising fuel economy and reducing emissions of NOx. Generally λ can be in the range 0.8 to 2.5

Figure 8:
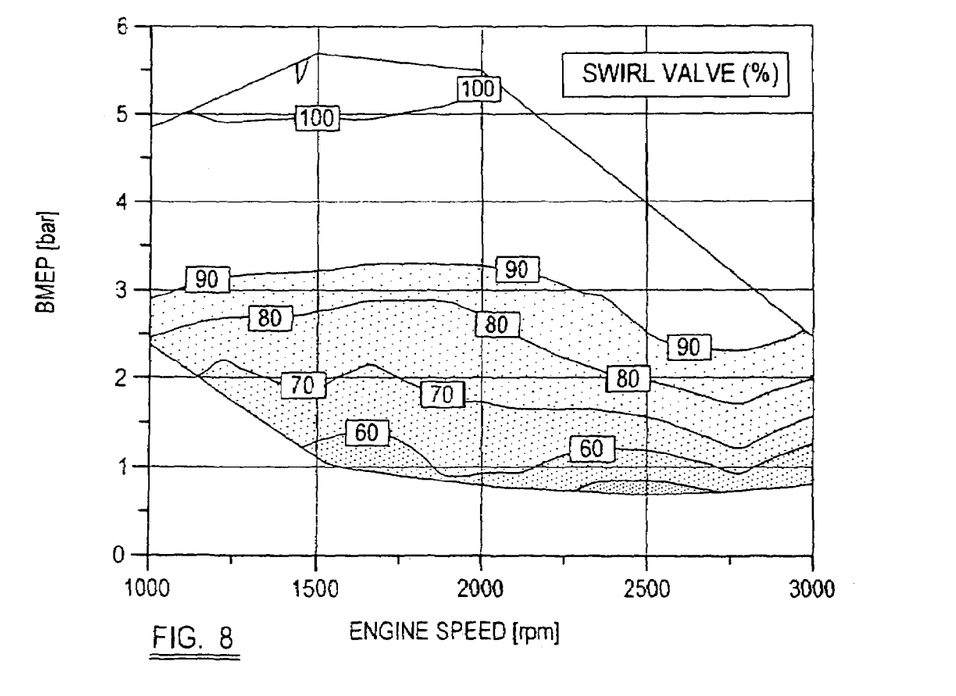
FIG. 8 is a graph showing a swirl valve position over the CAI operating regime of FIG. 4.
Figure 9:
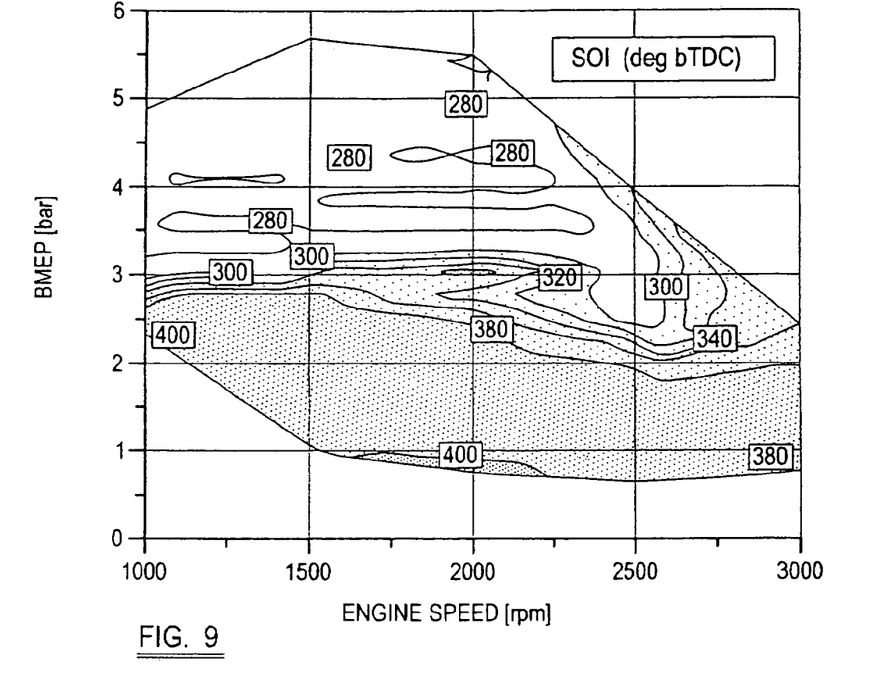
FIG. 9 is a graph showing the timing of the start of fuel injection over the CAI operating regime of FIG. 4.
Figure 10:
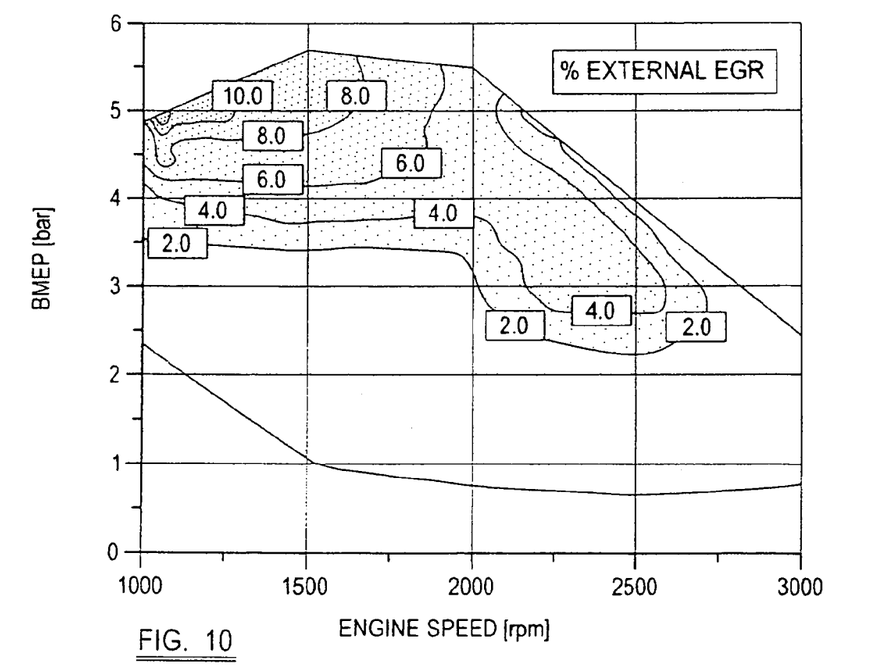
FIG. 10 is a graph showing the percentage of external EGR over the CAI operating regime of FIG. 4.
Figure 11:
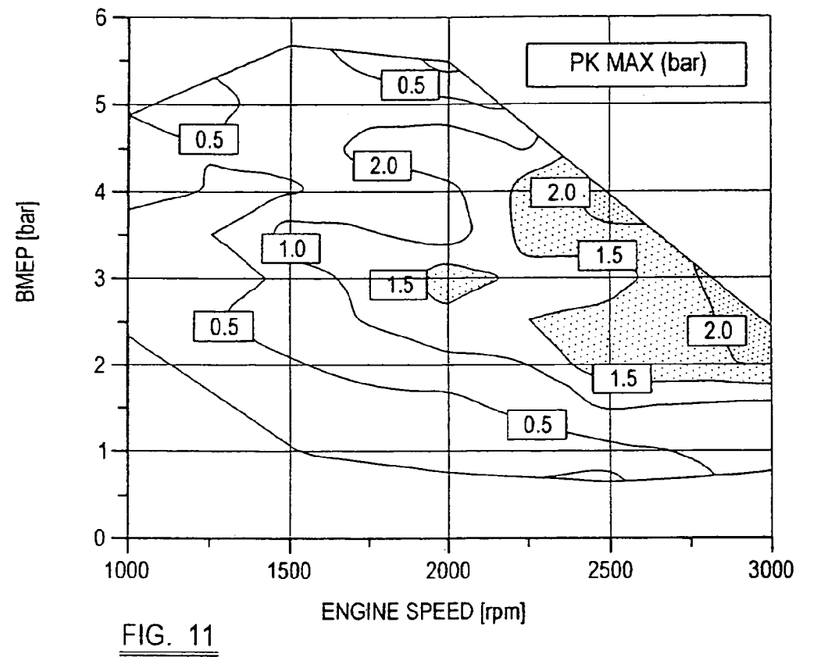
FIG. 11 is a graph showing the peak knocking pressure over the CAI operating regime of FIG. 4.
Figure 12:
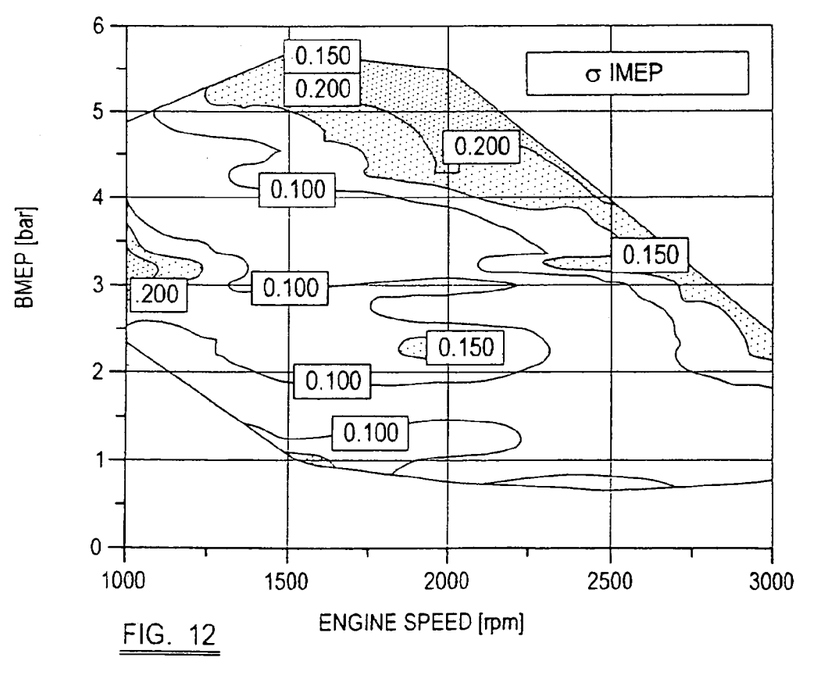
FIG. 12 is a graph of the load standard deviation over the CAI operating regime of FIG. 4.

The swirl valve operating is shown in FIG. 8. In general it is beneficial to partly open the valve under lean conditions, in region 60 of the map of FIG. 4. As the load increases, closing the valve provides greater swirl and improves gas mixing. FIG. 9 shows the timing of the fuel injection applied across the regime shown in FIG. 4, optimised across the CAI map to achieve minimum emissions of NOx and the lowest valves of peak knocking pressure and improved combustion stability. The values of external EGR, i.e. the proportion of the gas, air and fuel mix drawn into or supplied to the combustion chamber made of exhaust gases supplied by external EGR at an engine speed of 1500 rpm used are shown in FIG. 10, with up to 10% external EGR being required at low speeds and higher loads, as shown in the example of point $P_3$ of FIG. 4 above. At higher speeds, a high proportion of external EGR is required, for example 15% at 2000 rpm. The value of internal EGR, i.e. the proportion of the gas, air and fuel mix drawn or supplied to the combustion chamber made up of exhaust gas supplied by internal EGR, can be in the range of 20% to 99% and more preferably at least 30% and less than 80%. In the example of FIG. 5a, internal EGR varies between 33% and 49%.

The resulting peak knocking pressure and the variation in the load are shown in FIGS. 9 and 10. In general, the maximum knock as pressure was acceptable over the whole range of CAI operation as shown in FIG. 4 although at moderate speeds and high loads, the amount of external EGR required to suppress knocking results in unstable combustion with the standard deviation of the engine load approaching the acceptable limit of a standard deviation of 0.2.

The present invention may thus be cheaply and relatively easily applied to any appropriate internal combustion engine using any appropriate fuel, such as gasoline or a gasoline-like fuel such as a biofuel and alcohol, and may be useful in reducing fuel consumption and pollutant generation.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An internal combustion engine comprising:
an engine management unit,
a combustion chamber having an inlet port and an outlet port,
a fuel supply mechanism to supply a gasoline or gasoline-like fuel to the engine,
a valve train mechanism to permit introduction of air to the inlet port of the combustion chamber and release exhaust gases from the outlet port of the combustion chamber, and
an external recirculating system whereby exhaust gases from the outlet port may be passed to the inlet port, wherein:
the engine management unit is operable to:
control the valve train mechanism to retain or rebreathe exhaust gases within the combustion chamber to cause the engine to operate in a controlled auto ignition combustion mode, and
control the external recycling system to supply exhaust gases to the inlet port in the controlled auto ignition combustion mode, such that self-ignition occurs in the combustion chamber,
wherein the engine further comprises a spark plug, the engine management unit being operable to operate the spark plug to cause ignition in the combustion chamber when the engine is operating in a spark combustion mode,
the engine management unit being operable to detect that a transition from the spark combustion mode to the controlled auto-ignition combustion mode or vice-versa is required and is operable to control the valve train mechanism, a throttle to control inlet air mass flow, the external recirculating system and fuel supply mechanism to cause the transition.

2. An internal combustion engine comprising:
an engine management unit,
a combustion chamber having an inlet port and an outlet port,
a fuel supply mechanism to supply a gasoline or gasoline-like fuel to the engine,
a valve train mechanism to permit introduction of air to the inlet port of the combustion chamber and release exhaust gases from the outlet port of the combustion chamber, and
an external recirculating system whereby exhaust gases from the outlet port may be passed to the inlet port, wherein:
the engine management unit is operable to:
control the valve train mechanism to retain or rebreathe exhaust gases within the combustion chamber to cause the engine to operate in a controlled auto ignition combustion mode, and
control the external recycling system to supply exhaust gases to the inlet port in the controlled auto ignition combustion mode, such that self-ignition occurs in the combustion chamber,
wherein the engine management unit comprises stored controlled data indicating the quantity of exhaust gas to be retained or rebreathed in the combustion chamber and supplied through the external recirculating system as a function of the engine speed and engine load.

3. An internal combustion engine according to claim 2 further comprising at least one sensor responsive to an engine operating parameter, the engine management unit being operable to receive an output from the sensor and control the valve train mechanism and the external recirculating system in accordance with the output wherein the quantity of exhaust gas to be retained rebreathed in the combustion chamber and supplied through the external recycling system is additionally a function of the engine operating parameter.

4. An internal combustion engine comprising:
an engine management unit,
a combustion chamber having an inlet port and an outlet port,
a fuel supply mechanism to supply a gasoline or gasoline-like fuel to the engine, a valve train mechanism to permit introduction of air to the inlet port of the combustion chamber and release exhaust gases from the outlet port of the combustion chamber, and an external recirculating system whereby exhaust gases from the outlet port may be passed to the inlet port, wherein:

the engine management unit is operable to:

control the valve train mechanism to retain or rebreathe exhaust gases within the combustion chamber to cause the engine to operate in a controlled auto ignition combustion mode, and control the external recycling system to supply exhaust gases to the inlet port in the controlled auto ignition combustion mode, such that self ignition occurs in the combustion chamber, wherein the engine further comprises a throttle to control inlet air mass flow, the engine management unit being operable to control the throttle such that air pressure within the inlet manifold in the controlled auto-ignition combustion mode is at or near ambient pressure.

5. An internal combustion engine according to claim 4 wherein the inlet air temperature is at or near ambient temperature.

6. An internal combustion engine according to claim 4 wherein the proportion of exhaust gases retained or rebreathed in the combustion chamber is in the range 20% to 99%, and more preferably in the range 30% to 80%.

7. An internal combustion engine according to claim 4 wherein the proportion of exhaust gas supplied to the combustion chamber by the external recirculating system is up to about 10%.

8. An internal combustion engine according to claim 4 comprising at least one sensor responsive to an engine operating parameter, the engine management unit being operable to receive an output from the sensor and control the valve train mechanism and the external recirculating system in accordance with the output.

9. An internal combustion engine according to claim 8 comprising one or more sensors operable to detect one or more engine operating parameters selected from the group consisting of: intake air mass flow, exhaust composition, crank shaft position, cam shaft position, exhaust gas temperature, intake pressure, intake temperature.

10. An internal combustion engine according to claim 4 wherein the engine management unit comprises stored controlled data, the stored controlled data indicating the quantity of exhaust gas to be retained or rebreathed in the combustion chamber and supplied through the external recirculating system as a function of the engine speed and engine load.

11. An internal combustion engine according to claim 10 comprising at least one sensor responsive to an engine operating parameter, the engine management unit being operable to receive an output from the sensor and control the valve train mechanism and the external recirculating system in accordance with the output wherein the quantity of exhaust gas to be retained or rebreathed in the combustion chamber and supplied through the external recycling system is additionally a function of the engine operating parameter.

12. An internal combustion engine according to claim 4 further comprises a spark plug, the engine management unit being operable to operate the spark plug to cause ignition in the combustion chamber when the engine is operating in a spark combustion mode.

13. An internal combustion engine according to claim 12 wherein the engine management unit is operable to detect that a transition from the spark combustion mode to the controlled auto-ignition combustion mode or vice-versa is required and is operable to control the valve train mechanism, a throttle to control inlet air mass flow, the external recirculating system and fuel supply mechanism to cause the transition.

14. An internal combustion engine according to claim 4, wherein the engine management unit is operable to control the fuel supply mechanism.

15. An internal combustion engine according to claim 14, wherein the fuel supply mechanism is controllable such that the air-to-fuel ratio $\lambda$ is in the range 0.8 to 2.5.

16. An internal combustion engine according to claim 15, wherein the air-to-fuel ratio $\lambda$ is the range 1 to 1.6.

* * * * *